Oct. 23, 1962 R. L. EARLY ET AL 3,059,523
ELECTRONIC APPARATUS FOR COMPUTING AREAS
Filed Nov. 8, 1957 5 Sheets-Sheet 1

INVENTORS
RICHARD L. EARLY
THOMAS B. SORBIE
BY
Rule and Hoge,
ATTORNEYS

Oct. 23, 1962  R. L. EARLY ET AL  3,059,523
ELECTRONIC APPARATUS FOR COMPUTING AREAS
Filed Nov. 8, 1957  5 Sheets-Sheet 2
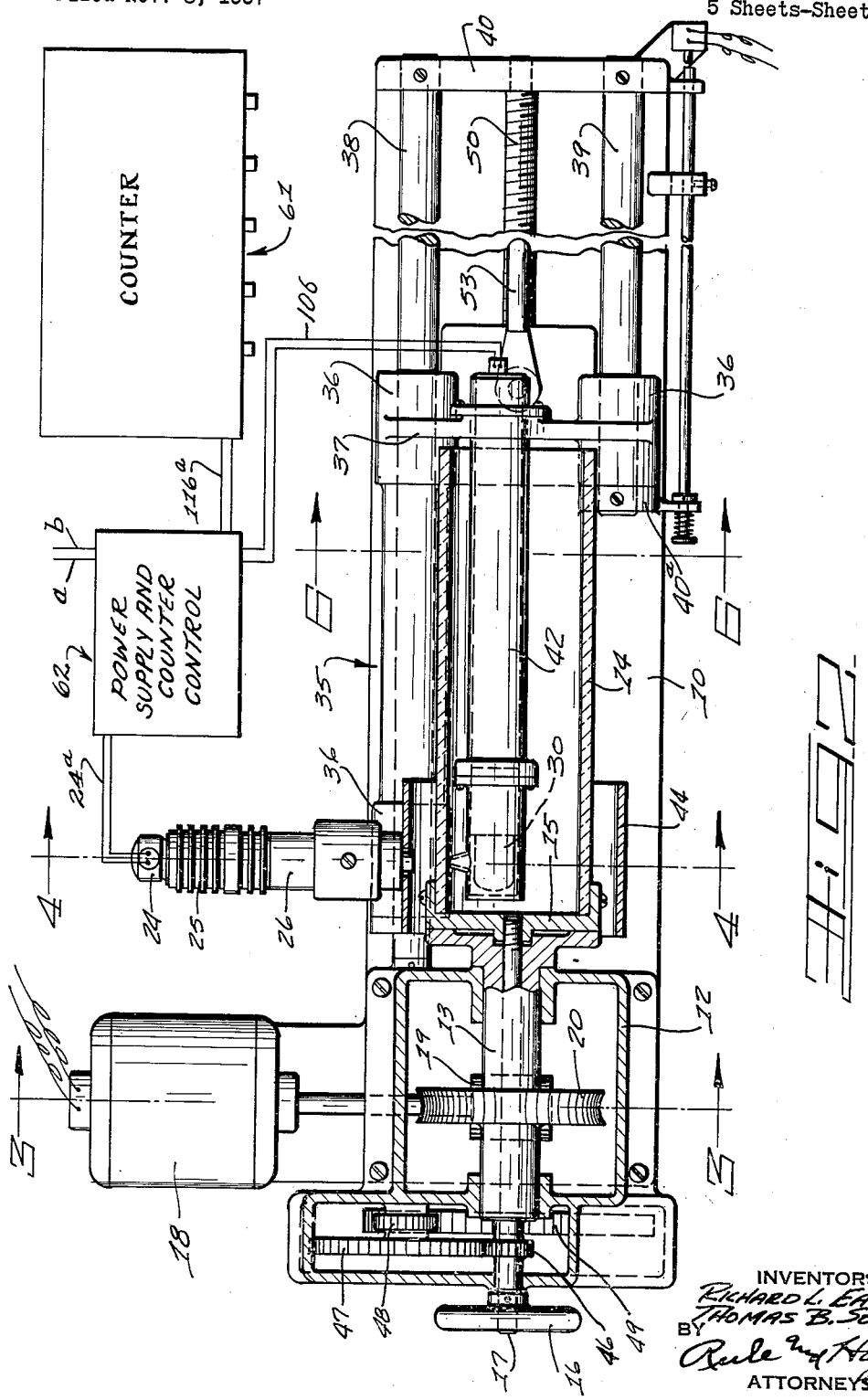
INVENTORS
RICHARD L. EARLY
THOMAS B. SCRIBE
BY
Rule and Hogle
ATTORNEYS

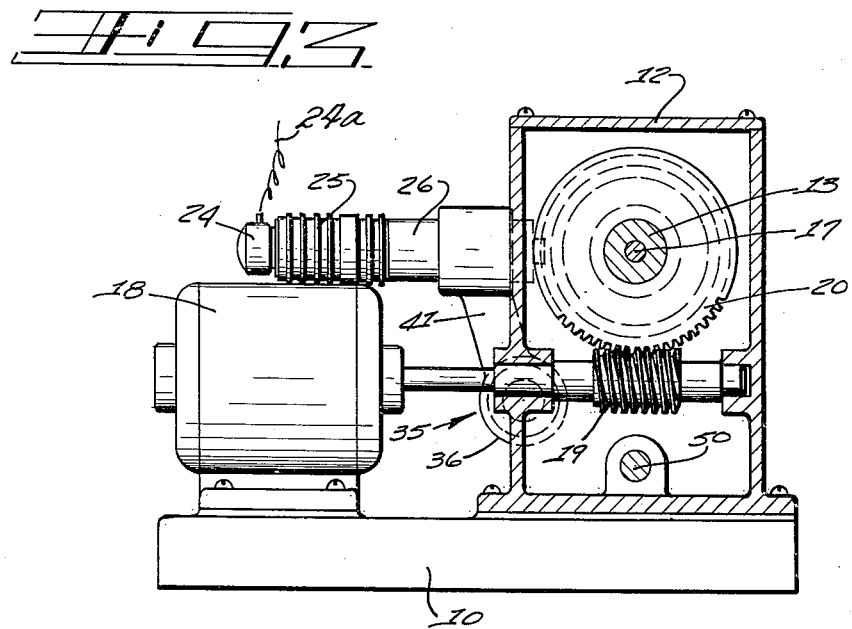
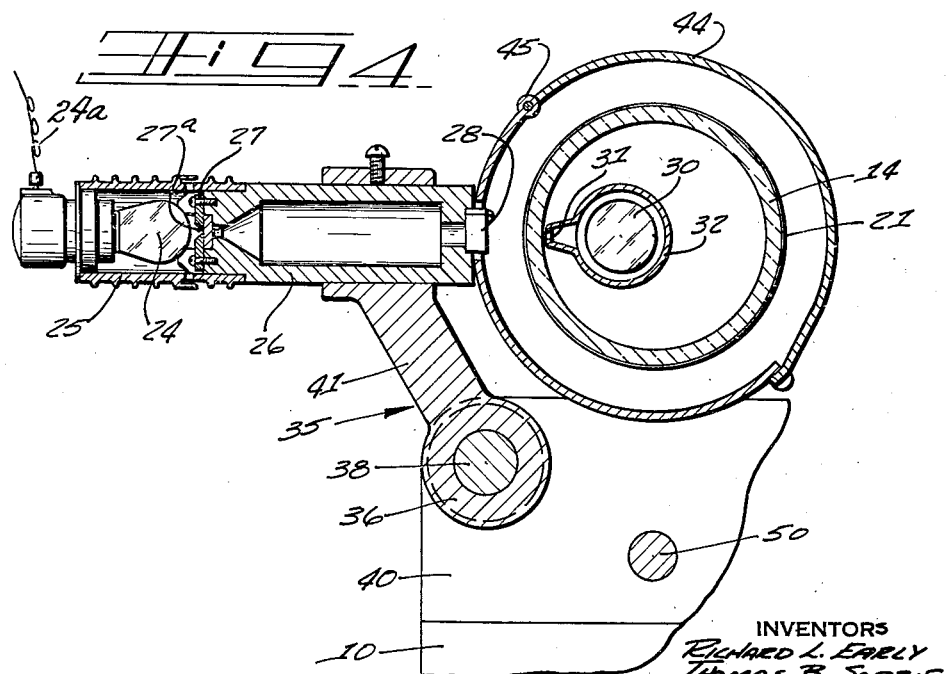

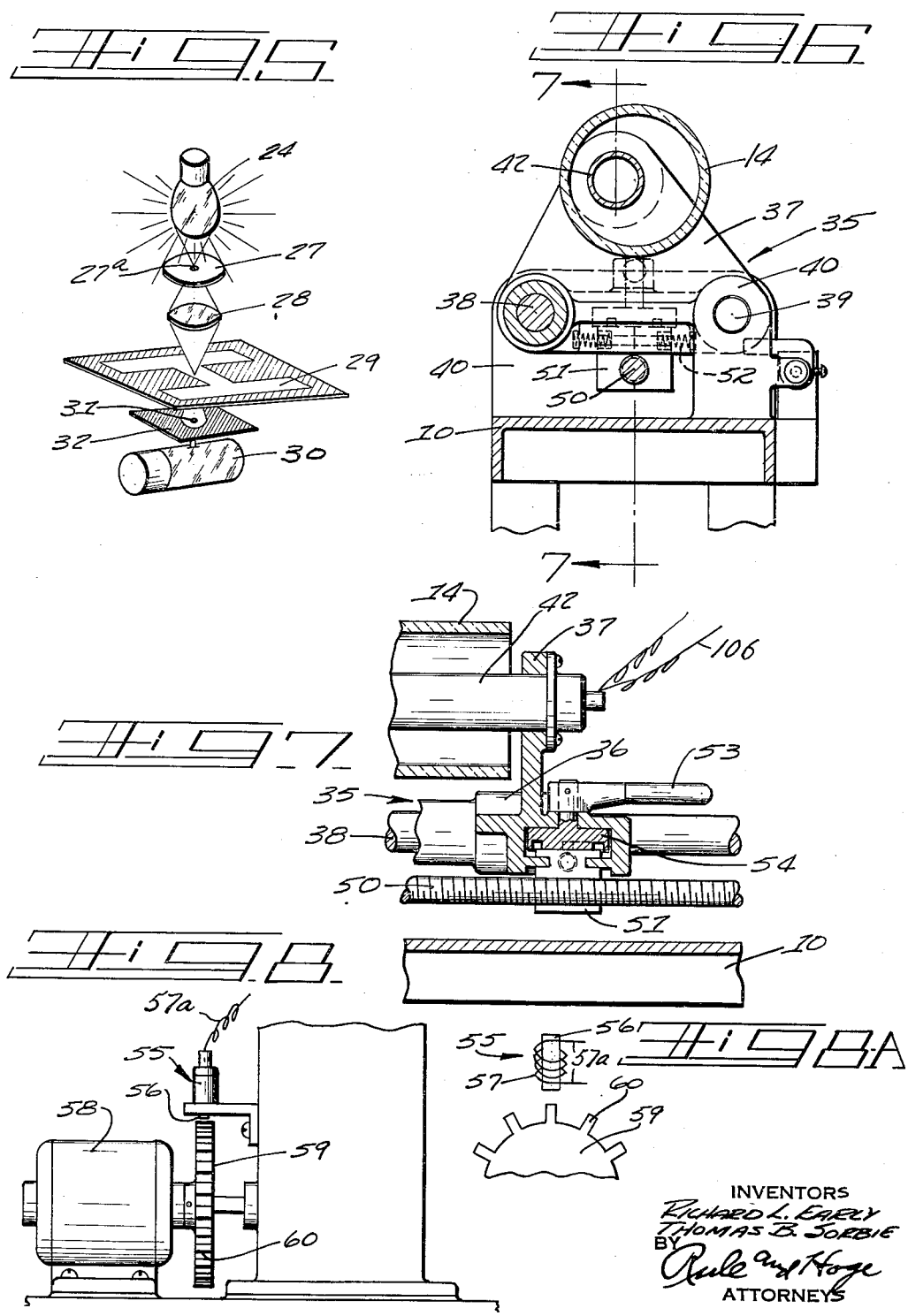

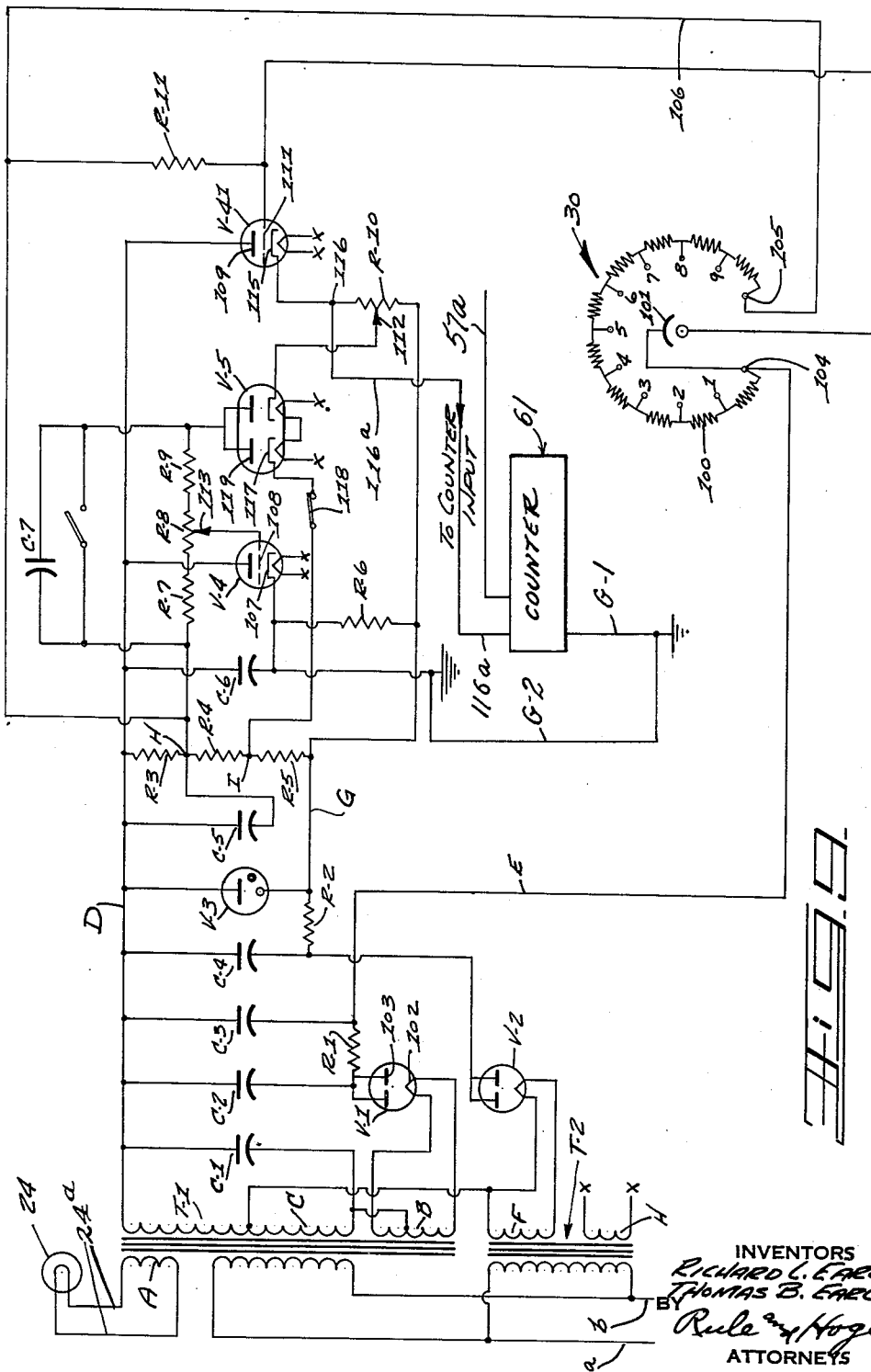

United States Patent Office 3,059,523
Patented Oct. 23, 1962

3,059,523
ELECTRONIC APPARATUS FOR
COMPUTING AREAS
Richard L. Early and Thomas B. Sorbie, Toledo, Ohio, assignors to Owens-Illinois Glass Company, a corporation of Ohio
Filed Nov. 8, 1957, Ser. No. 695,320
8 Claims. (Cl. 88—14)

The present invention relates to an apparatus for computing surface areas and is particularly designed for computing the area of an irregular surface portion, as, for example, that portion of a surface covered by a picture or design. In a preferred form of the invention, as herein illustrated and described in detail, the invention is used for measuring the area of a picture or design such as is commonly applied as a decoration on bottles or other articles.

An object of the invention is to provide a practical apparatus for computing such areas. It provides, for example, a means for estimating the amount of a decorating ink or material required for the decoration of any specified number of articles to which the picture or design is to be applied.

In practicing the invention, in the form herein illustrated, a film negative of the design is prepared. The negative is mounted on a transparent drum in which is positioned a light sensitive cell such as a multiplier photoelectric cell. The drum with the negative film wrapped thereon is masked with opaque material so that only the negative is exposed. A light source external to the drum directs a light beam through the transparent film to the light sensitive cell. The drum is rotated about its axis and at the same time the light source and photo cell are moved lengthwise of the drum so that the entire area of the negative is scanned by the light beam. When the light is striking a transparent portion of the negative it passes on through the drum to the photo cell. When the beam is on an opaque portion of the negative no light will reach the photo cell.

The photo cell output controls the operation of electronic means for computing the area of the transparent portion of the negative. Such computing means may comprise, for example, an electronic counter or an electromagnetic counter and an electronic gate in the counter, the gate being operated by the photo cell output. When the gate is opened a signal from a magnetic pickup is admitted to the counter and registered. When the gate is closed the signal from the magnetic pickup does not reach the counter. The gate is open when half or more of the light beam reaches the photo cell and closed when less than half the light beam reaches the photo cell. The counter thus registers a predetermined number of counts per unit of transparent area of the film negative.

Referring to the accompanying drawings, which illustrate a preferred form of apparatus for practicing our invention:

FIG. 2 is a sectional plain view of the same;

FIG. 3 is a section at the line 3—3 on FIG. 2;

FIG. 4 is a section at the line 4—4 on FIG. 2, showing the light source and means for directing a light beam through the film negative to the multiplier photo cell;

FIG. 5 is a schematic view illustrating the means for directing a light beam through the negative to the photoelectric cell;

FIG. 6 is a section at the line 6—6 on FIG. 2;

FIG. 7 is a section at the line 7—7 on FIG. 6;

FIG. 8 is a detail view showing the magnetic pickup device;

FIG. 8A is a diagrammatic view of the same;

FIG. 9 is a wiring diagram of the electronic system.

Figure 1:
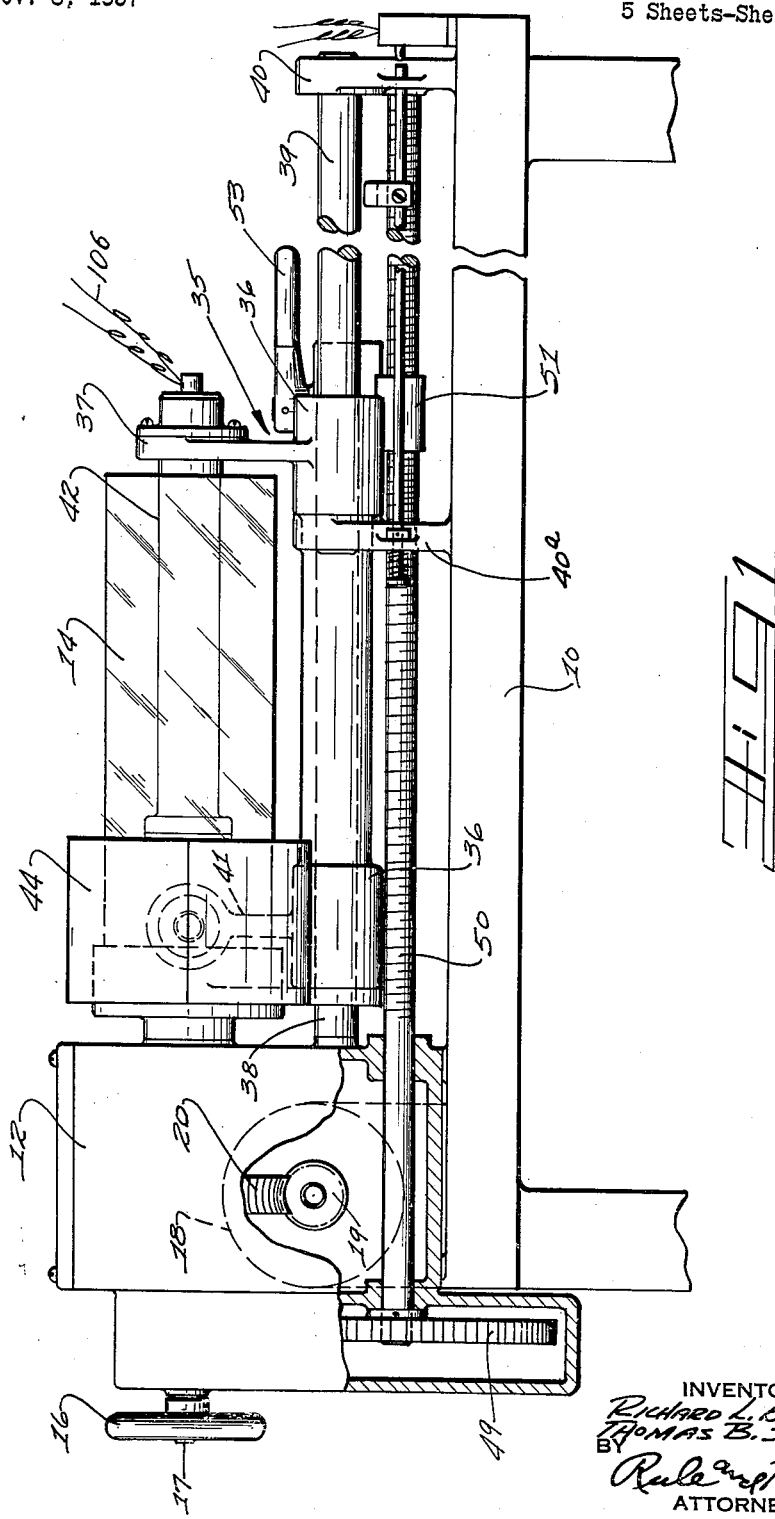
FIG. 1 is a longitudinal part sectional elevational view of the apparatus with parts broken away.

Referring to FIGS. 1 and 2, the operating parts of the apparatus are mounted on a stationary frame or base 10. A gear case 12 mounted on the base 10 has journalled therein a shaft 13 to which is attached a drum 14 for rotation with the shaft about its horizontal axis. The drum is attached to the shaft by means of a head 15. A hand wheel 16 attached to the drum through a shaft 17 provides means for manually rotating the drum for adjustment purposes. The drum or cylinder 14 is made of transparent material, preferably Lucite, although glass or other transparent material can be used. The drum 14 is rotated about its axis by a motor 18 operating through a train of gearing including a worm 19 (FIG. 3) fixed to the motor shaft and driving a worm gear 20 mounted on a shaft 13.

In practicing the invention, a film negative 21 is made of the design, the area of which is to be computed. The film is wrapped around the drum 14. The drum is then masked by opaque material so that no light can reach the photo cell within the drum except that which can pass through the transparent portions of the negative representing the design. The light beam is supplied by a lamp 24 (FIGS. 4 and 5) mounted in a shell 25 attached to a cylindrical holder 26. The light beam passes through a small aperture 27a in a diaphragm 27 and through a condensing lens 28 which focuses the beam at the film 21. The beam passes through the transparent design 29 on the film negative and is transmitted to the photo-electric cell 30. The light beam is directed through a small aperture 31 in a screen 32 surrounding the cell.

Means for moving the lamp 24 and the cell 30 as a unit lengthwise of the drum 14 while the latter is rotating comprises a carriage 35 mounted for horizontal movement axially of the drum. The carriage includes cylindrical members 36 connected by an integral yoke 37. The members 36 are slidably mounted on horizontal shafts 38 and 39, each attached at its outer end to a stationary frame member 40 mounted on the base 10. The opposite end of the shaft 38 is connected to the gear casing 12. The inner end of the shaft 39 is attached to a post 40a which limits the movement of the carriage 35 in one direction. The holder 26 (FIG. 4) for the lamp 24 is connected by a bracket arm 41 to the carriage 35 for travel therewith. The photo-multiplier cell 30 is mounted in the free end of a horizontal tubular carrier 42 which has a fixed connection at its opposite end to the yoke 37. A cylindrical screen 44 made in sections connected by a hinge 45, surrounds the drum 14 and photo-electric cell and is connected to travel with the cell and light beam.

The carriage 35 and parts carried thereby are moved lengthwise of the drum 14 by the motor 18. The motor operates through speed reduction gearing including the shaft 13, a pinion 46 (FIG. 2) connected to rotate with the shaft 13, gears 47 and 48, the latter running in mesh with a gear 49 keyed to a screw threaded shaft 50 which serves as a lead screw driving the scanning operation. The shaft 50 is screw threaded through a split bearing block 51 (FIGS. 6 and 7) which is connected to the end plate 37 of the carriage 35. The sections of the bearing block are held together by springs 52 and may be spread apart by a hand lever 53 operating through a cam 54. This permits the carriage to be returned by hand after each scanning operation.

During the scanning operation the drum 14 is rotated at any reasonable speed by the motor 18. The lead screw 50 advances the photo cell and light source at a preferred rate of .005" for each complete rotation of the drum. The light beam is focused so that a microscopic spot, such as a spot of light less than .005" in diameter is striking the film surface and passes on through to the photo cell. When the light beam is on an opaque portion of the film, no light will reach the photo cell.

FIGS. 8 and 8A illustrate a signal device for supplying electrical impulses or signals to the counter. This comprises a magnetic pickup 55 of known construction and which may be obtained on the open market. The device includes a magnetic core 56 and a coil 57 wound thereon. A motor 58 has keyed to its shaft a magnetic element 59 in the form of a gear wheel having teeth or projecting lugs 60. The motor 58 is driven in synchronism with the motor 18. As the gear 59 rotates, the teeth or lugs 60 pass in succession through the magnetic field of the winding 57, thereby producing a voltage signal which is transmitted by leads 57a to the input terminal of the electronic counter 61 to furnish electrical pulses to the counter, which is hereinafter described.

The power supply system 62 (FIG. 2) supplying voltage to the photo-multiplier cell 30 (FIG. 9) and the means by which the operation of the cell is controlled will now be described. Referring to the wiring diagram, FIG. 9, the photo-multiplier cell 30 is of usual construction including a voltage divider consisting of resistors 100 connected in series and the cathode 101 which is energized by the light beam. Power is supplied through the mains a, b in an alternating current system, for example, a 115 volt system. A constant voltage regulating transformer T1 with its primary connected across the mains a, b, includes a secondary winding A supplying current through conductors 24a to the lamp 24 which supplies the light beam. Another winding B supplies current to heat the cathode 102 of a rectifier tube V1. A transformer, as known generally in the electronic trade as a "sola" transformer, may be used for T1. This type transformer is described in U.S. Patents 2,143,745, 2,212,198, and 2,346,621.

A source of direct current for the operation of the photo-multiplier tube 30 comprises a secondary winding C of the transformer T1, the vacuum rectifier tube V1, a condenser C2, a resistor R1, and a condenser C3. The voltage across the condenser C3 is preferably about 900 volts D.C., with the upper plate of the condenser positive and the lower plate negative, the condenser being connected between the bus D and the bus E.

A transformer T2 includes a secondary winding F which supplies current for heating the cathode of a vacuum rectifier tube V2. One half of the transformer winding C of transformer T1, the rectifier V2, a condenser C4, a voltage drop resistor R2, and a voltage regulator tube V3, form a source of regulated direct current voltage which appears across the plate and cathode of the tube V3, such plate and cathode being connected respectively to the bus D and the bus G. The bus G is negative to the bus D, preferably by about 150 volts.

Dual triodes V4 and V41 are shown as separate cells but may, if desired, be in the same envelope. A winding H of the transformer T2 supplies current for heating the filaments of the dual triodes V4, V41 and the filament of a dual diode tube V5. A capacitor C1 is connected in parallel with the winding C of the transformer T1 and these may be obtained as a commercial package unit. The capacitor C1 and core of the transformer T1 form a resonant circuit that serves to regulate the output voltages of the transformer.

A voltage divider comprising resistors R3, R4 and R5, connected in series, is connected between the bus bars D and G. The voltage at the junction H of the resistors R3 and R4, is the most positive voltage that can be applied to the grids 108 and 111 of the cathode followers V4, V41, so that the voltage drop across resistor R3 is their minimum grid to plate voltage. The plates of the tubes V4 and V41, are connected through the bus D to the resistor R3. The drop across the resistor R3 is preferably about 100 volts. This voltage is necessary for the operation of the cathode followers V4 and V41.

The left hand triode V4 has its cathode 107 connected to ground. A condenser C6 serves to bypass transient electrical signals between the bus D and ground. The voltage of the grid 108 of tube V4, measured with respect to the junction H, controls the plate current through the tube V4 and, consequently, the current through the cathode resistor R6. If the grid 108 should become more negative the current through, and the voltage drop across, resistor R6 decreases. This action makes the bus G less negative to ground potential. Since the voltage between the junction H and the bus G is constant, the effect of increased negative voltage on the grid 108 will be to make the junction H less negative or more positive to ground.

The cathode follower tube V41 has its plate 109 connected to the bus D. Its cathode resistor R10 is connected to the bus G while its grid 111 is connected to the junction H through the plate load resistor R11 of the photo-multiplier tube 30. The current through and the voltage drop across the cathode potentiometer R10 are controlled by the voltage at the grid 111 which in turn is controlled by the voltage drop across the resistor R11. The voltage drop across the resistor R11 is controlled by the amount of light that reaches the photo-multiplier tube.

The tap 112 of the potentiometer R10 is adjusted, while there is no light on the photo tube, so that the potential at the tap 112 is equal to the potential at the junction H. Negative excursions at the top of the resistor R10 caused by negative excursions of the grid 111, which in turn are caused by increased voltage drop across resistor R11, due to light striking the photo tube, will charge a condenser C7 through the right hand diode of the tube V5. The right hand plate of the condenser C7 will become negative to its left hand plate. This voltage will slowly dissipate through a voltage divider composed of a resistor R7, a potentiometer R8, and a resistor R9 connected in series, the said series being connected in parallel with the condenser C7. The tap 113 of the potentiometer R8 is connected to the grid 108 of cathode follower tube V4 and is so adjusted that the voltage that appears between the junction H and the tap 113 will be about one-half of the voltage drop across resistor R11 when the photo cell is illuminated fully by the light passing through the negative. A condenser C5 is connected between the bus D and the junction H and serves as a bypass condenser that maintains a substantially uniform direct current voltage across the resistor R3 while the condenser C7 is charging through the right hand diode of tube V5. The grid 108 of triode V4 will be held at a potential equal to half of the maximum voltage swing experienced by the grid 111 because of the slow decay of the charge impressed on the condenser C7. Since the right and left cathode followers of tubes V41 and V4 are nearly identical and their respective cathode resistors are practically identical, and since they have a common power supply and as they are nearly linear amplifiers, within limits, the voltage measured between their cathodes will be in direct proportion to the voltages appearing at their grids.

When the photo tube 30 is again shadowed the cathode 115 of tube V41 will be positive to ground and to the cathode 107 of tube V4. When the photo tube 30 is fully illuminated the cathode voltage of tube V41 will be negative to ground by an amount equal to the amount that it was positive to ground while the photo tube was not illuminated. When the light beam is obscured to half intensity the voltage measured between ground and the cathode of tube V41 will be zero.

The electronic counter 61 used in the present invention may be of a type known and used commercially, thus requiring no detailed description thereof in the present application. An electronic counter which we have used with satisfactory results in practicing our invention is that known as the Berkeley counter No. 7250CD, supplied by the Beckman Instruments, Inc., Berkeley Division, Richmond, California.

The electronic counter 61 is connected between ground and the cathode 115 of the tube V41, the counter input circuit extending from the point 116, FIG. 9, through lead 116a. The ground circuit for the counter is made between the grounded plate of condenser C6 and ground G1 of the counter by connection G2. While the area of the film negative is being measured, small negative voltage excursions with respect to ground trigger the counter "on." When the voltage at its input swings through zero to a positive value, the counter stops counting.

The cathode 117 of the left diode of tube V5 is connected through a normally closed switch 118 to the junction I of the resistances R4 and R5. Its plate 119 is connected to the right hand plate of the condenser C7. The voltage drop across the resistance R4 prevents the condenser C7 from discharging completely when the photo-tube is in shadow. The negative voltage maintained at the grid 108 of the tube V4 by the clamping action of the left diode (of tube V5) as energized by the voltage drop across resistance R4, will maintain the cathode 107 of tube V4 negative with respect to the cathode 115 of tube V41 when there is no voltage drop across resistance R11 which is the case when the photo tube is in shadow. However, if the condenser C7 has been recently charged, then the voltage across it may be greater than the voltage across resistance R4, in which case the existing voltage across condenser C7 will be sufficient to maintain a positive input to the counter. This will maintain the counter inactive against false signals whenever the photo tube is in shadow. This is achieved by impressing a small voltage at the counter input when the photocell is in shadow or the unit is shut off. This voltage, in the present example, is in the form of a positive voltage applied to the counter input so as to assure it against operation as such positive voltage is applied.

The photo-multiplier cell 30 has its terminal 105 connected through lead 106 to junction H for its positive supply. The negative supply to the tube 30 is through the bus bar E. The voltage divider as shown comprises ten series connected resistances 100, of for example, 100,000 ohms each. When light illuminates the cathode 101 of the photo-multiplier cell the electrons thereby released are multiplied in passing from one dynode to another thereby increasing the current in a well-known manner. The plate current passes through the resistor R11 and the voltage drop across this resistor is in proportion to the illumination on the cell 30.

The voltage changes at the cathode 115 of tube V41 are in proportion to the illumination changes at the photo-multiplier tube. The grid 108 of the tube V4 receives a lesser voltage than cathode 115 but a voltage proportional to the greatest illumination experienced by the photo-multiplier. The voltage at the grid 108 controls the potential between ground and the positive supply to the photo-multiplier cell, so that the voltage excursions experienced by the cathode 115 of the right tube V41 will go through zero potential with respect to ground when half of the light beam from the lamp is transmitted to the photo-multiplier cell. When negatives are being scanned the counter will trigger "on" when the voltage at its input goes negative, and "off" when the signal at its input goes through zero potential to positive. During a scanning operation the output of the photo-electric cell 30 operates an electronic gate in the counter 61. While the light beam is being transmitted to the cell the gate remains open and the signals from the magnetic pick-up device fed through line 57a are transmitted to the counter and registered. When the light beam is cut off from the cell 30 the gate in the counter is closed so that the signals from the magnetic pickup do not reach the counter. The gate is open when more than half of the light beam reaches cell 30, and closed when half or less than half the light beam reaches the cell. It will thus be apparent that the counter registers a number of counts proportional to the transparent area comprised in the design which is being scanned.

As a practical example, the apparatus may be so designed that the counter will register 100,000 counts per square inch of transparent area on the film negative. For such operation the drum 14 on which the film negative is wound may be four inches in diameter and, for example, may be rotated at the constant rate of five complete rotations per second. The lead screw 50 may advance the light source and photo-electric cell .005 inch during each complete rotation of the drum. The magnetic pickup may operate to give signals at the rate of 500 for one inch circumferential advance of the drum. With the parts so proportioned, 100,000 counts will be given for each square inch of transparent area traversed by the light beam.

As a substitute for the magnetic pickup device and its operating gear, a fixed frequency oscillator may be employed for the use of such oscillator. The drum 14 and the lead screw 50 both are driven from a synchronous motor. As an example, the drum 14 may be four inches in diameter and revolve at 300 r.p.m. The oscillator may have a frequency of 31,416 cycles per second. This gives 100,000 counts per square inch of transparency scanned, the same as in the preceding example given with the use of the magnetic pickup device.

The proportions and rate of operation as set forth in the above examples give practical results. Variations in these proportions and modifications of the apparatus may be resorted to within the spirit and scope of our invention, as defined by the appended claims.

We claim:

1. A machine for determining the area of a design comprising a cylindrical surface onto which a negative transparency of the design is affixed, means for rotating said cylindrical surface at a constant speed, means for directing a focused light beam against said surface, said beam being less than .005″ in diameter at the spot where it strikes the surface of said negative, means mounting a light-sensitive cell in the path of the light beam with the said surface between the light source and the cell, means interconnecting said last-two-named means for maintaining said cell and the light source in fixed relation, means for moving the light beam and the light-sensitive element together along the axis of said cylindrical surface at a constant rate from one end of the said design to its other end, thereby energizing said cell during that portion of the movement in which the light beam is directed against and passing through the negative transparency, an electrical counter, and means operable for deriving an electrical signal responsive to transmission of at least a one-half portion of the total radiation of said light beam through the negative to the light-sensitive element and connected to said counter to thereby electrically determine the area of the design as a function of the time during which said portion of the radiation passes through the transparency to the light-sensitive cell.

2. Apparatus for determining the area of a design of irregular contour, said apparatus comprising a hollow transparent cylindrical drum, means for mounting a transparency of said design on the cylindrical surface of the drum, a lamp supplying a radiation beam, a photoelectric cell, means for positioning said cell within the drum, means for mounting the lamp exterior to the drum in fixed spaced relation to the cell and adapted to transmit a light beam toward the cell, means for rotating the drum about its axis, means for relatively concurrently moving the lamp and the cell axially of the length of the drum thereby causing the light beam to scan a surface of the drum including said transparency, means supplying a voltage to the cell, an electronic control system controlling the voltage applied to the cell thereby producing an electrical signal during the portion of the scanning operation in which the light beam is traversing said transparency, said signal being produced by the cell whereby said signal is interrupted respective to decreased intensity of the light beam as it traverses an area outside said transparency, an electronic counter, a magnetic pick-up device including a solenoid and a gear, means for rotating said gear in synchronization with the rotation of said drum, said gear comprising magnetic elements moved in succession through the magnetic field of the solenoid thereby producing electrical pulses at a predetermined frequency, and means for transmitting said pulses to the counter, the counter being operable to register the pulses while receiving said signal from the cell to indicate the area.

3. Apparatus for determining the area of a design of irregular contour, said apparatus comprising a hollow transparent cylindrical drum, means for mounting a transparency of said design on the cylindrical surface of said drum, a lamp supplying a radiation beam, a photoelectric cell, means for positioning said cell within the drum, means for mounting the lamp exterior to the drum in fixed spaced relation to the cell and adapted to transmit a light beam into the cell, means for rotating the drum about its axis, means for relatively concurrently moving the lamp and the cell axially of the length of the drum thereby causing the light beam to scan a surface of the drum including said transparency, means supplying a voltage to the cell, an electronic control system comprising means for interrupting the signal from said cell to the counter when at least one-half the light beam is cut off from the cell during the scanning operation, the cell thereby producing an electrical signal during the scanning operation in which the light beam is traversing said transparency, an electronic counter, an electrical pulse generator means operating in synchronism with the rotation of the drum producing pulses at a predetermined frequency, and means electrically connected to the cell and controlled by the signal from the cell for transmitting said pulses to the counter, the latter being operable to register the pulses while a signal is transmitted from the cell to indicate the area.

4. Apparatus for computing the area of a design, said apparatus comprising a horizontal cylindrical drum mounted for rotation about its axis, said drum comprising a substantially uniformly transparent cylindrical wall, a carriage mounted for movement lengthwise of the drum, a lamp, a holder for the lamp attached to the carriage for travel therewith, a photoelectric cell, a carrier for the cell projecting into the drum through an open end thereof and attached to the carriage for movement in unison therewith, the said lamp and cell being held in fixed relative positions, a motor geared to the drum for rotating it about its axis, means geared to the motor for moving the carriage and its said attached carrier lengthwise of the drum during rotation of the drum, means for focusing a light beam from said lamp radially toward the surface of the drum, the said cell receiving radiation of the light beam only when it is transmitted through the wall of the drum, whereby a negative transparency of the said design overlying the surface of the drum is scanned by the light beam during lengthwise movement of the drum and rotation of the drum, and a magnetic pickup including a solenoid and core, a magnetic element in the form of a gear wheel having teeth of magnetic material, means for rotating said element in synchronism with the motor for rotating the drum for moving said teeth in succession through the magnetic field of said solenoid and thereby producing electrical pulses at a fixed rate per inch of peripheral travel of the surface of the drum past said light beam, means adapted to receive and count said pulses, and control means for transmitting said pulses to the counter, said means being responsive to the receipt of at least one-half of the focused radiation of said light beam by said cell, whereby said pulses are transmitted and counted as a function of transparent area of the design.

5. A machine for computing the area of a design configuration comprising means for furnishing a focused light beam, means for moving a surface including a transparent negative of said design in endless fashion through said beam, said light beam focusing means including a focusing adjustment so that a microscopic spot of light will strike the surface of said negative and thereby transmit radiation through transparent portions of said negative, a light-sensitive element, means for mounting said element in the path of the light beam and connected to said first-named means for maintaining a fixed spacing between the light source and the light-sensitive element on opposite sides of the negative during endless movement of said surface, means for advancing the light beam and the light-sensitive element together along said surface from one end of the design to its other end and in a direction normal to the direction of the endless movement of said surface, the light-sensitive element being energized during the portion of movement in which the light beam is transmitted through the said transparency, an electronic counter capable of registering and counting electrical pulses, a generator means producing electronic pulses at a predetermined frequency, means for transmitting said pulses to the counter, and control means operated by the light-sensitive means for operating the counter only by a negative voltage output of the control means which is produced responsive to a predetermined portion of the total intensity of the light beam being transmitted to the light-sensitive element, whereby the counter operates to integrate the area of the design of said transparency as a function of the time during which said predetermined portion of the light beam is passing through the transparency.

6. The apparatus defined in claim 5, the means for producing said pulses comprising a high frequency oscillator, the frequency thereof being such as will generate a predetermined number of electrical pulses during traverse of a unit of area of the moving surface by the focused light beam.

7. The combination of a hollow cylindrical drum of transparent material, means for mounting the drum for rotation about its axis, a lamp, a carriage on which the lamp is mounted, a photoelectric cell, a carrier positioned within said drum and carrying said cell in fixed spaced relation to said lamp, said carrier connected to said carriage for travel in unison to maintain said fixed relationship between the lamp and the cell, lens means mounted on the carriage for the lamp and intermediate the lamp and the drum for focusing a micro beam of radiation from the lamp through the wall of the drum and the said cell, means for rotating the drum about its axis, means for effecting a concurrent relative movement of the said carriage and drum in a direction lengthwise of the drum and thereby causing the light beam to scan a design spread on the surface of the drum, an electronic counter capable of registering and counting electrical pulses, a generator means producing electrical pulses at a predetermined frequency, means for transmitting said pulses to the counter, and control means operated by said cell for operating the counter only by a voltage output of said cell that is produced in response to a light intensity transmitted to said cell that is at least a predetermined fraction of the total light intensity of the beam of radiation of the lamp, whereby the counter operates to integrate the area of the design as a function of the time during which said predetermined light intensity is passing through the transparency.

8. Apparatus for measuring the area of a design, said apparatus comprising a hollow member rotatable about its longitudinal axis and having a cylindrical surface to which a negative transparency of the design is affixed, means for rotating said member at constant speed, means directing a light beam against said surface and focusing said beam so that but a microscopic spot of light strikes said surface, means mounting a light-sensitive cell in the path of said light beam with the said surface between the point of origin of said beam and the cell, said means maintaining the cell and light source in fixed relation, means moving the light beam and the light-sensitive element together along the axis of the hollow cylindrical member at a constant rate, the light-sensitive element being energized during that portion of the movement in which the light beam is directed against and passes through the said transparency, an electronic counter capable of registering and counting electrical pulses, a generator means producing electrical pulses at a predetermined frequency, means for transmitting said pulses to the counter, and control means operated by the light-sensitive means and including a cathode follower, the latter operating the counter only by its negative voltage output which is produced responsive to a predetermined intensity of the light beam being transmitted to the light-sensitive element, whereby the counter operates to integrate the area of the design of the negative transparency as a function of the time during which said predetermined light intensity is passing through the transparency.

References Cited in the file of this patent

UNITED STATES PATENTS

| | | |
|---|---|---|
| 1,985,044 | Lyle | Dec. 18, 1934 |
| 2,015,738 | Winkley et al. | Oct. 1, 1935 |
| 2,179,000 | Tea | Nov. 7, 1939 |
| 2,184,156 | Bowles | Dec. 19, 1939 |
| 2,184,162 | Stockbarger et al. | Dec. 19, 1939 |
| 2,294,643 | Wurzburg | Sept. 1, 1942 |
| 2,354,768 | Nokes | Aug. 1, 1944 |
| 2,356,761 | Jones et al. | Aug. 29, 1944 |
| 2,398,238 | McNatt | Apr. 9, 1946 |
| 2,398,904 | Libman et al. | Apr. 23, 1946 |
| 2,573,464 | Lowenstein et al. | Oct. 30, 1951 |